(12) United States Patent
Miller, Jr.

(10) Patent No.: US 9,787,827 B2
(45) Date of Patent: Oct. 10, 2017

(54) SYSTEMS AND METHODS FOR FUSED SERVICES INCLUDING AN INTEGRATED MANAGEMENT SYSTEM

(75) Inventor: Paul Miller, Jr., Derry, NH (US)

(73) Assignee: GENBAND US LLC, Plano, TX (US)

( * ) Notice: Subject to any disclaimer, the term of this patent is extended or adjusted under 35 U.S.C. 154(b) by 705 days.

(21) Appl. No.: 13/077,723

(22) Filed: Mar. 31, 2011

(65) Prior Publication Data

US 2011/0246620 A1    Oct. 6, 2011

Related U.S. Application Data

(60) Provisional application No. 61/319,708, filed on Mar. 31, 2010.

(51) Int. Cl.
| | |
|---|---|
| G06F 15/16 | (2006.01) |
| H04M 3/42 | (2006.01) |
| H04N 21/4786 | (2011.01) |
| H04N 21/4788 | (2011.01) |
| H04N 21/61 | (2011.01) |
| H04M 7/00 | (2006.01) |

(52) U.S. Cl.
CPC ... *H04M 3/42068* (2013.01); *H04M 3/42042* (2013.01); *H04M 3/42365* (2013.01); *H04N 21/4786* (2013.01); *H04N 21/4788* (2013.01); *H04N 21/6118* (2013.01); *H04N 21/6168* (2013.01); *H04M 7/0024* (2013.01); *H04M 2201/50* (2013.01); *H04M 2203/655* (2013.01)

(58) Field of Classification Search
CPC ......... H04M 3/42042; H04M 3/42068; H04M 3/42365; H04M 7/0024; H04M 2201/50; H04M 2203/655; H04N 21/4786; H04N 21/6118; H04N 21/6168; H04N 21/4788
USPC ........................................................ 709/219
See application file for complete search history.

(56) References Cited

U.S. PATENT DOCUMENTS

| | | | |
|---|---|---|---|
| 6,212,550 B1 * | 4/2001 | Segur | 709/206 |
| 6,563,919 B1 * | 5/2003 | Aravamudhan et al. | 379/230 |
| 6,868,143 B1 * | 3/2005 | Menon et al. | 379/88.13 |

(Continued)

OTHER PUBLICATIONS

International Search Report and Written Opinion in International Application No. PCT/US2011/030788 dated Jul. 27, 2011.

*Primary Examiner* — Philip Chea
*Assistant Examiner* — Wing Ma
(74) *Attorney, Agent, or Firm* — Fogarty LLP

(57) ABSTRACT

Systems and methods for fusing, for a subscriber, a plurality of applications and subscriber data across a plurality of subscriber access devices are described. The system includes a fusion server coupled to a voice-over-IP telephony switch and a television EBIF server. The fusion server receives and stores the subscriber data such as a list of contacts. The fusion server receives a communication in a first format from a first subscriber access device such as a set-top box, and translates the communication from the first format to a second format. The first and second formats include at least two of session initiation protocol (SIP), hypertext transfer protocol (HTTP), voice-over-IP (VoIP), simple object access protocol over extensible markup language (SOAP/XML), remote procedure call (RPC), and enhanced tv binary exchange format (EBIF). The fusion server transmits the translated communication to a second subscriber access device such as a smart phone or tablet computer.

23 Claims, 9 Drawing Sheets

(56) References Cited

U.S. PATENT DOCUMENTS

| | | | |
|---|---|---|---|
| 8,090,856 B1* | 1/2012 | Bonefas | H04L 63/101 709/230 |
| 8,370,435 B1* | 2/2013 | Bonefas et al. | 709/206 |
| 8,683,510 B1* | 3/2014 | Daly | H04N 21/6175 725/32 |
| 2002/0116530 A1* | 8/2002 | Burgess | 709/246 |
| 2002/0156936 A1* | 10/2002 | Burgess | 709/328 |
| 2004/0131081 A1* | 7/2004 | Bhatia et al. | 370/466 |
| 2004/0203614 A1* | 10/2004 | Qu et al. | 455/412.1 |
| 2005/0182644 A1* | 8/2005 | Douvikas | G06F 17/30067 705/26.1 |
| 2005/0193057 A1* | 9/2005 | Owen et al. | 709/203 |
| 2005/0233735 A1* | 10/2005 | Karaoguz | H04L 29/06027 455/415 |
| 2006/0069722 A1* | 3/2006 | Dowling | 709/203 |
| 2006/0115062 A1 | 6/2006 | Gonder et al. | |
| 2006/0161512 A1* | 7/2006 | Schaedler et al. | 707/1 |
| 2006/0167972 A1* | 7/2006 | Zombek et al. | 709/202 |
| 2007/0041541 A1* | 2/2007 | Liou | H04M 1/2745 379/142.04 |
| 2007/0124439 A1* | 5/2007 | Shah | G06F 9/54 709/223 |
| 2007/0242809 A1* | 10/2007 | Mousseau | H04M 7/0036 379/88.18 |
| 2007/0248221 A1* | 10/2007 | Chatterjee | H04M 3/42042 379/211.02 |
| 2008/0013712 A1* | 1/2008 | Gopinath | 379/218.01 |
| 2008/0109839 A1* | 5/2008 | Bruce | H04L 12/587 725/25 |
| 2008/0181377 A1* | 7/2008 | Qiu | H04L 12/58 379/93.24 |
| 2009/0017848 A1* | 1/2009 | Teppo et al. | 455/466 |
| 2009/0022140 A1* | 1/2009 | Cassanova et al. | 370/352 |
| 2009/0028307 A1 | 1/2009 | Kister et al. | |
| 2009/0074159 A1* | 3/2009 | Goldfarb | H04M 1/247 379/88.13 |
| 2009/0209274 A1 | 8/2009 | Sangberg et al. | |
| 2009/0214007 A1* | 8/2009 | Van Wyk et al. | 379/88.19 |
| 2009/0222414 A1* | 9/2009 | Mattox | G06F 17/3056 |
| 2009/0290693 A1* | 11/2009 | K. N. | H04M 1/2473 379/88.17 |
| 2009/0290696 A1* | 11/2009 | K. N. | H04M 1/2473 379/142.04 |
| 2009/0300139 A1* | 12/2009 | Shoemaker et al. | 709/217 |
| 2010/0158211 A1* | 6/2010 | Chatterjee | H04M 1/575 379/88.12 |
| 2010/0159963 A1* | 6/2010 | Lewis et al. | 455/466 |
| 2011/0107379 A1* | 5/2011 | Lajoie et al. | 725/87 |
| 2011/0153766 A1* | 6/2011 | Ramchandani | H04L 41/0226 709/207 |
| 2011/0256889 A1* | 10/2011 | Polis et al. | 455/456.3 |
| 2011/0271153 A1* | 11/2011 | Polis et al. | 714/57 |
| 2011/0282949 A1* | 11/2011 | Rivkin | 709/206 |
| 2012/0122498 A1* | 5/2012 | Huang | 455/466 |
| 2013/0124658 A1* | 5/2013 | Fioretti | G06Q 10/10 709/206 |

* cited by examiner

SYSTEMS AND METHODS FOR FUSED SERVICES INCLUDING AN INTEGRATED MANAGEMENT SYSTEM

CROSS-REFERENCE TO RELATED APPLICATIONS

This application claims the benefit of U.S. Provisional Patent Application Ser. No. 61/319,708, filed Mar. 31, 2010. The contents of this application are hereby incorporated herein in their entirety.

FIELD OF THE INVENTION

This invention relates generally to systems and methods for fused services, including but not limited to data storage and communications across a variety of applications and services. This invention also relates to commonly-owned U.S. Pat. Nos. 6,931,211, 7,466,924, 7,505,456, 7,035,289, and 7,450,614, and to pending U.S. patent application Ser. No. 12/367,253, filed Feb. 6, 2009, and pending U.S. patent application Ser. No. 12/477,507, filed Jun. 3, 2009. The contents of each of these patents and patent applications are hereby incorporated herein in their entirety.

SUMMARY OF THE INVENTION

Cable, fixed line, and mobile operators have typically been faced with telecommunications, video, and data service solutions and architectures that were developed for other industries, classes of providers, scales, and physical plants. Said solutions and architectures are typically vertically independent 'silos' of functionality, with no cross solution value, other than the attraction of a single commercial source for 'triple play' or 'quad play' services to the subscriber. These operators are therefore able to provide inter alia internet telephony, cable television, and broadband internet services or service platforms to their subscribers. In addition, these operators may also provide or support applications that are enabled by these services. Applications enabled by broadband internet service include e-mail, internet websites such as netflix.com or facebook.com, online retailers such as amazon.com, and online marketplaces such as ebay.com. Applications enabled by cable television service include digital video recorder applications, video-on-demand applications, voice-over-IP applications. Applications enabled by telephony include caller ID, call waiting, and voice mail.

However, quite often, a subscriber's experience using these services is cumbersome because subscribers do not have access to their subscriber data (e.g., list of contacts, e-mail addresses, phone numbers, live presence or location information, status on a social networking website, etc.) when using the aforementioned applications across the various access devices. For instance, a user generally cannot receive a phone call or listen to a voicemail on their set-top box as well as their mobile phones. Nor can a user generally fuse the web-based contact information with their phone service or television set. In addition to being disadvantageous to consumers who increasingly prefer a "fusion" of applications across each of their subscriber access devices (e.g., set-top boxes, telephones, smart phones, personal computers, tablet computers, or mobile phones), such deficiencies have caused cable, fixed line, and mobile providers to lose a number of subscribers, a phenomenon referred to as subscriber turnover or churn. Further, cable, fixed-line, and mobile operators are having difficulty attracting new subscribers due to OTT (over the top) competitors such as Google and Skype. In other words, cable, fixed line, and mobile system operators are simply unable to link the applications on any of these platforms in a meaningful manner or provide a fusion of these applications and the services they provide, and often lose customers as a result. Yet, advantageously, the system operator is uniquely positioned by (1) directly providing the physical interface and routed connectivity for multiple access types (TV, phone/VoIP, broadband internet IP, wireless voice and data) and (2) having ownership of the subscribers account data and preference data. Fusing a variety of applications and subscriber data intelligently together to provide unique contemporary services simultaneously across multiple access devices provides for the first time the solution for an operator to effectively compete, reduce churn, and attract new subscribers by providing contemporary services that can compete with OTT competitors. For instance, if a subscriber isn't able to view a unified list of their contacts, where such a list is aggregated from various sources such as their facebook.com friends list, e-mail contacts list, telephone contacts list, etc., then the subscriber is more likely to use a difference service provider that may be able to provide such fusion. Additionally, to the advantage of both operators and subscribers, the operator is uniquely positioned by deploying a fusion server to further combine said aggregated contact information in combination with various system or network events, such as replacing an inbound caller ID information with the facebook.com user name preference, adding video or photo information to call logs, presenting presence information from IM services in the contact book, etc. In this manner, multiple applications and their data are fused together to provide a completely integrated experience. Finally, this fused application set, enabled by the fusion server's connectivity and logic, is then presented to any number of access devices in the format most appropriate for that presentation device. Examples include cell phones, smartphones, PDAs, tablet computers, general purpose personal computers, televisions via set-top interfaces, telephones and VoIP terminals.

The systems and methods described herein provide an enhanced user-experience platform that enables a subscriber to experience the fusion of applications and subscriber data across a variety of services and subscriber access devices.

In one aspect, the invention relates to a method for fusing, for a subscriber, a plurality of applications across a plurality of subscriber access devices. The method includes receiving, by a fusion server, subscriber data for at least one subscriber and storing this subscriber data in a database of the fusion server. The method further includes receiving a first communication event in a first format that originated from a first application of a first of the plurality of applications. The plurality of subscriber access devices includes at least one set-top box. The method further includes translating, by the fusion server, the communication event from the first format to a second format. Translation involves receiving of a first event in a first format, application of intelligent logic that may include updating a database of the fusion server, querying a database of the fusion server, compiling the received information from the first communication event with subscriber or other data from other applications, then producing a second communication event, possibly in a second format.

The first and second formats include at least two of session initiation protocol (SIP), hypertext transfer protocol (HTTP), voice-over-IP (VoIP), simple object access protocol over extensible markup language (SOAP/XML), remote procedure call (RPC), and set-top communication formats. Set top communication formats may include any one of EBIF (enhanced binary interface format), tru2way, JAVA, FLASH, IPTV or IMS, and may be transmitted by IP (internet protocol) or other more proprietary and/or conventional methods. It will be clear to those skilled in the art that as new protocols emerge, they may be easily added to the fusion server, rapidly enabling future access devices and applications to be added to the set supported by the fusion server. The method further includes transmitting, by the fusion server, the second communication event intended for a second application, thereby converging the first and second applications and providing an enhanced subscriber experience. Events and interfaces may both transmit and receive formatted information, in other words, applications may initiate events to access devices, and users may initiate events or requests to the applications. A first communication event received by the fusion server may produce multiple second communication events, possibly in second formats, for the purpose of presenting fused services across multiple access devices simultaneously.

In some embodiments, the access devices includes two or more from the set of; a mobile phone, a smart phone, a VoIP phone, a tablet computer, a set-top box, a personal computer, and a public switched telephone network (PSTN) telephone.

In some embodiments, the subscriber is a cable television subscriber.

In some embodiments, the plurality of applications includes an application for managing the subscriber's voicemail across the plurality of subscriber access devices. In some embodiments, the plurality of applications includes an application for managing the subscriber's list of contacts across the plurality of subscriber access devices. In some embodiments, the plurality of applications includes an application for managing the subscriber's electronic mail across the plurality of subscriber access devices. In some embodiments, the plurality of applications includes an application for managing caller identification for a subscriber's telephone number across the plurality of subscriber access devices. In some embodiments, the plurality of applications includes an application for managing the reception of calls for a subscriber's telephone number across the plurality of subscriber access devices. In some embodiments, the plurality of applications includes an internet website application accessible across the plurality of subscriber access devices. In some embodiments, the plurality of applications includes an application for identifying the presence of a user on a particular access device. In some embodiments, the plurality of applications includes an application for managing the subscribers preference regarding the configuration and selection of different applications that are presented via their access devices.

In some embodiments, translating the communication from the first format to the second format includes extracting, by the fusion server, a portion of the communication including subscriber identification information from the first of the subscriber access devices. Translating the communication from the first format to the second format also includes retrieving, by the fusion server, identifying information for the second of the subscriber access devices from the database of the fusion server. Translating the communication from the first format to the second format further includes inserting, by the fusion server; the retrieved subscriber identification data or other relevant application data into a communication in the second format. Translating the communication event for the first format to the second format also includes applying logic to query other applications or otherwise gather information to complete the second format's data. A first communication event received by the fusion server in a first format may produce multiple second communication events, possibly in second formats, for the purpose of presenting fused services across multiple access devices simultaneously.

In another aspect, the invention relates to a system that enables the fusion for a subscriber of a plurality of applications across a plurality of subscriber access devices. The system includes a fusion server. The fusion server includes a processor, a memory including a database, and a network interface. The fusion server is coupled to a voice-over-IP telephony switch and a television EBIF server, which routes information to an access device such as a set-top box for the purpose of presenting a user interface to, and receiving interaction from, the subscriber. The fusion server is configured to receive subscriber data for at least one subscriber and store the received subscriber data in the database. The fusion server is configured to receive subscriber device information and store the received subscriber device information in the database. The fusion server is also configured to receive subscriber application information including subscription and preferences, and store the received subscriber information in the database. The fusion server may actively query sources such as databases or other applications on remote devices, or such query sources may autonomously transmit this information to the fusion server. The fusion server is further configured to receive a communication in a first format that originated from a first application of a first of the plurality of applications. The plurality of subscriber access devices includes at least one set-top box and at least one computing or telephony device. The fusion server is further configured to translate the communication from the first format to a second format. The first and second formats include at least two of session initiation protocol (SIP), hypertext transfer protocol (HTTP), voice-over-IP (VoIP), simple object access protocol over extensible markup language (SOAP/XML), remote procedure call (RPC), and enhanced tv binary exchange format (EBIF) formats. The fusion server is further configured to transmit the translated communication intended for a second application of the second of the plurality of access devices, thereby fusing the first and second applications and providing an enhanced subscriber experience.

In some embodiments, the subscriber is a cable television subscriber.

In some embodiments, the plurality of applications includes an application for managing the subscriber's voicemail across the plurality of subscriber access devices. In some embodiments, the plurality of applications includes an application for managing the subscriber's list of contacts across the plurality of subscriber access devices. In some embodiments, the plurality of applications includes an application for managing the subscriber's electronic mail across the plurality of subscriber access devices. In some embodiments, the plurality of applications includes an application for managing caller identification for a subscriber's telephone number across the plurality of subscriber access devices. In some embodiments, the plurality of applications includes an application for managing the reception of calls for a subscriber's telephone number across the plurality of subscriber access devices. In some embodiments, the plurality of applications includes an internet website application accessible across the plurality of subscriber access devices. In some embodiments, the plurality of applications includes an application for identifying the presence of a user on a particular access device. In some embodiments, the plurality of applications includes an application for managing the subscribers preference regarding the configuration and selection of different applications that are presented via their subscriber access devices.

In some embodiments, the fusion server is configured to translate the communication from the first format to the second format by (1) extracting a portion of the communication including subscriber identification information from the first of the subscriber access devices, (2) retrieving identifying information for the second of the subscriber access devices from the database of the fusion server, and (3) inserting the retrieved subscriber identification data into a communication in the second format.

In some embodiments, the fusion server is configured to receive a communication event from a first application such as a class 5 telephony switch or internet application, combine information from the database of the fusion server which may include subscriber data, preferences, or recorded application information from other application sources, and create a second communication even to be transmitted to an access device to present the information to a subscriber.

BRIEF DESCRIPTION OF THE DRAWINGS

The following figures depict certain illustrative embodiments of the invention in which like reference numerals refer to like elements. These depicted embodiments may not be drawn to scale and are to be understood as illustrative of the invention and as not limiting in any way.

DETAILED DESCRIPTION OF THE ILLUSTRATED EMBODIMENTS

To provide an overall understanding of the invention, certain illustrative embodiments will now be described, including a system for fusing applications and subscriber data, and components thereof. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
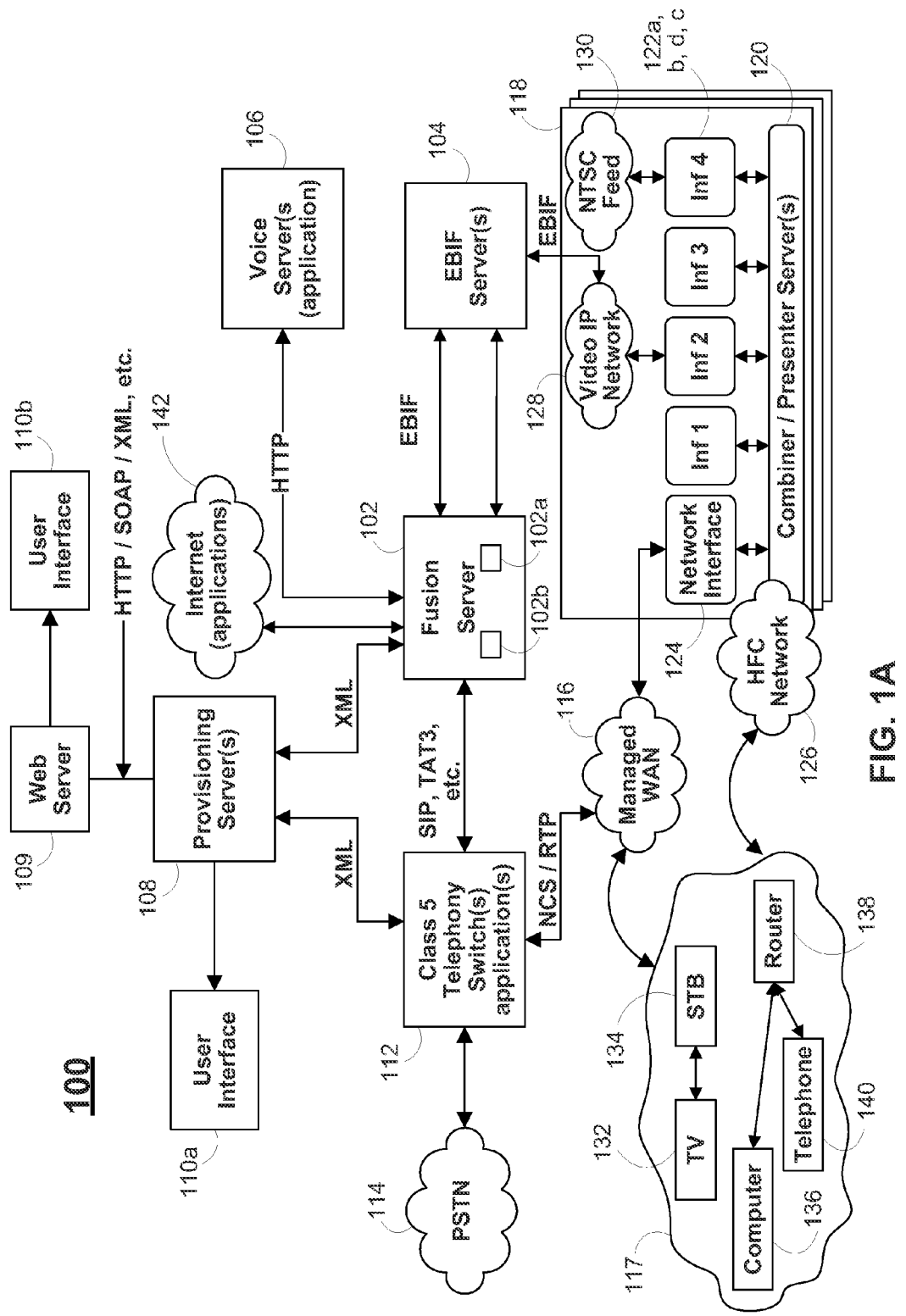
FIG. 1A is a schematic of a system for fusing applications and subscriber data, according to an illustrative embodiment of the invention.

FIG. 1A is a schematic of a system 100 for fusing applications and subscriber data, according to an illustrative embodiment of the invention. System 100 includes a fusion server 102, which is coupled to the internet 142, voice server 106, EBIF server 104, class 5 telephony switch(s) 112 and provisioning server 108, with the respective communication links shown in FIG. 1A. The communication links may include communications over any combination of networks such as the Internet 142, and may be any suitable wired or wireless communications link. Each of the aforementioned servers may include more than one server. The EBIF server 104 is coupled to the NTSC Feed 130 and Video IP Network feed 128 in Head End 118. In turn the NTSC feed 130, for providing cable and broadcast television programming, and the Video IP network 128, for providing packets of video data, e.g., youtube.com videos, are coupled to existing television infrastructure Infs 1, 2, 3, and 4 (122a, 122b, 122c, and 122d, respectively) and to Network Interface 124 of the Head End 118. Infs 1, 2, 3, 4, are coupled to a combiner/presenter server(s) 120. Head End 118 is coupled to one or more subscriber access devices 117 via an HFC network 126 and/or the Managed Wide Area Network (WAN) 116. Subscriber access devices 117 may include a TV 132 coupled to an interactive television guide device such as set-top box (STB) 134. Subscriber access devices 117 may also include a router 138 which may be coupled to a personal computing device 136 (e.g., a personal computer or tablet computer) and, optionally, to a telephone 140. The telephone may be a voice-over-IP (VoIP) phone, in which case a connection to a router is usually required, or a PSTN phone, or a cellular phone.

With continued reference to FIG. 1A, the subscriber access devices 117 may be coupled to class 5 telephony switch(s) 112 via the managed WAN 116. The class 5 telephony switch(s) 112 are coupled to a PSTN 114 and to the provisioning server 108. The provisioning server is coupled to a web server 109. The provisioning server and the web server each have respective user interfaces 110a and 110b. Each of user interfaces 110a, 110b may include a user input device such as a keyboard, mouse, or touch screen, and a display device. The links between each of the aforementioned components of FIG. 1A are labeled with the types of message formats for the data and/or communications transmitted or received between a set of components. Those skilled in the art would come to realize the meanings of each of these message formats, e.g., HTTP, SOAP, XML, EBIF, NCS, RTP, SIP, TAT3, etc. For instance, the data between fusion server 102 and voice server (e.g., a voice mail server) 106 includes data in HTTP format, while the data between fusion server 102 and EBIF server(s) 104 includes data in EBIF format.

In operation, fusion server 102 includes components such a memory 102a and a CPU 102b. These and other components of the fusion server 102 are described further below with respect to FIG. 1B. The memory 102a includes a database in which subscriber data is stored. For instance, television subscriber data such as the serial number or other identifying information for a subscriber's set-top box may be stored in the database of memory 102a. Memory 102a also includes application data for various internet, tv, or mobile device applications. For instance, memory 102a may store a subscriber's facebook.com profile information (e.g., a subscriber's facebook.com status) or youtube.com profile, their cable television set-top box username and other account information, their VoIP telephone number and other identifying information, etc. Thus, the database in memory 102 allows fusion server 102 to have "application intelligence", that is, to store information from various applications and from subscribers (to, e.g., a cable television service or voice-over-IP phone service) across a variety of subscriber access devices so as to enable to fusion of these applications and the subscriber data.

Fusion server 102 is able to aggregate the subscriber data and provide useful information to the subscriber across a variety of subscriber access devices. For instance, a subscriber may receive a call on their mobile phone which may include the phone number of the caller and their facebook.com profile status. A subscriber would then be armed with additional information during a phone call that would not otherwise be observed without the application intelligence-enabled fusion server 102. In particular, fusion server 102 stores applications data and subscriber data in a database, and is configured to receive messages in one format and translate these messages to another format, to enable communication between two subscriber access devices and/or two applications on the same subscriber access device. For instance, voice server(s) 106 may be configured to store subscriber voice mails and other voice data, e.g., call logs, caller id logs, etc. Fusion server 102 is configured to retrieve these voice data by transmitting commands to the voice server(s) 106.

As a further end-to-end illustrative example, a VoIP phone call may be routed from telephone 140 via router 138 through the Managed WAN 116 to a class 5 telephony switch 112. Switch 112 initiates a communication session in SIP protocol with fusion server 102. Fusion server 102 looks up the subscriber data and determines which set-top box corresponds to the subscriber to whom the telephone call was intended. Fusion server 102 in turn communicates the caller information (e.g., phone number, subscriber name, set-top box identifying information, and other application and/or subscriber data) in an EBIF-ready format to EBIF server 104. EBIF server 104 then transmits this formatted message to a subscriber access device such as STB 134 via one of the apps running at the head end 118 and being presented to the user via the combiner/presented server(s) 120. The formatted message may include an instruction to the set-top box to display a "Call from Subscriber X" message on the STB 134. The message on the STB 134 may include other information, e.g., "Call from Subscriber X who is online at facebook.com". In this manner, the VoIP phone call, the application intelligence from facebook.com, and the subscriber data from the fusion server converge in a manner that is highly beneficial to both the subscriber that placed the phone call and the subscriber that is the intended recipient of the phone call.

The CPU 102b is configured to perform the steps of a process for fusing the applications and subscriber data across the subscriber access devices 117. This process is described in further detail with respect to FIGS. 1C-6.

Figure 1B:
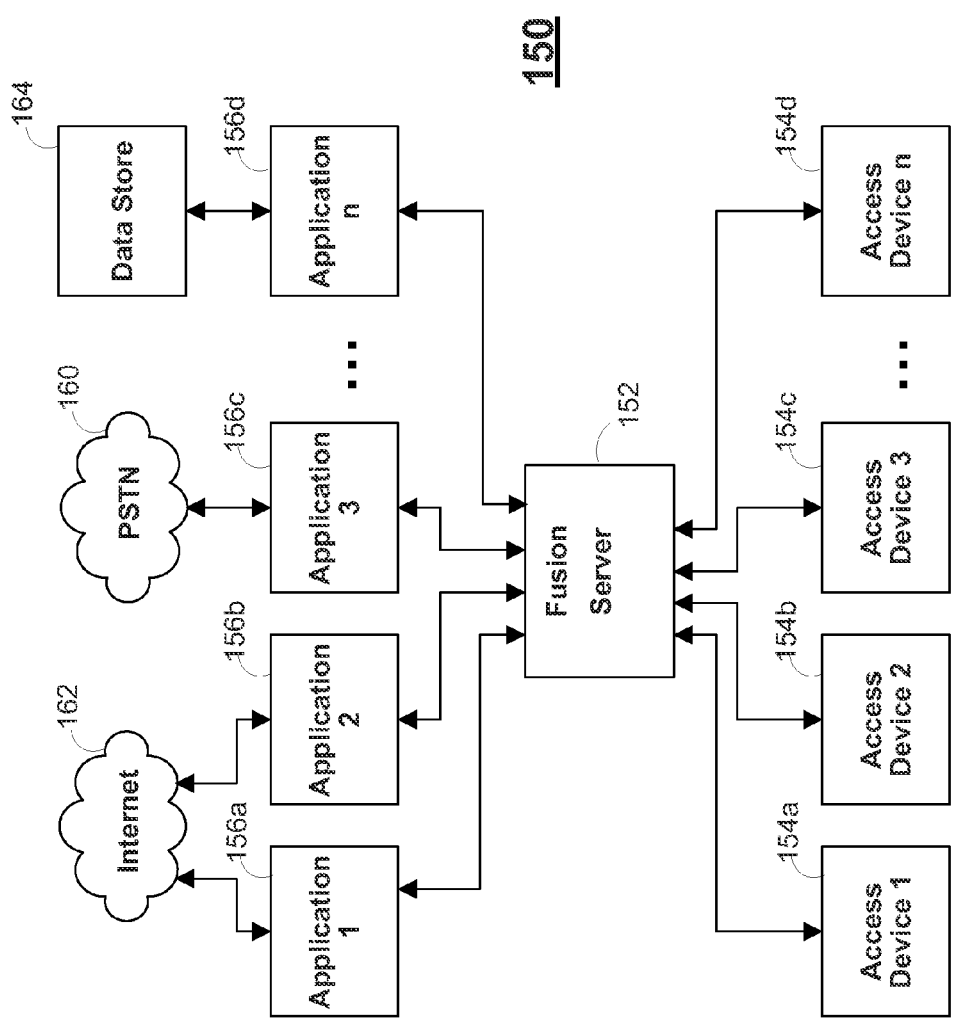
FIG. 1B is a second schematic of a system for fusing applications and subscriber data, according to an illustrative embodiment of the invention.

FIG. 1B is a second schematic of a system 150 for fusing applications and subscriber data, according to an illustrative embodiment of the invention. The system of FIG. 150 may be configured to implement a method for fusing applications, subscriber data, and access methods, according to an illustrative embodiment of the invention. The method for fusing applications, subscriber data, and access methods includes a fusion server 152, having two major interface directions.

With continued reference to FIG. 1B, the first major interface direction is to a set of applications, examples of which are given as 156a, 156b, 156c and 156d. The number of applications required is exemplary and extends to any number 'n' as needed to deploy any number of applications that are to be fused, as clearly illustrated in the schematic of system 150. Applications 156a and 156b, as representative applications, may be connected to the internet 162 via any suitable wired and wireless communication link. Access to relevant subscriber data may be obtained via the Internet 162. Examples or relevant subscriber data include address book and contact information from email servers, social media platforms such as facebook.com or yahoo.com. Examples of other information that could be obtained from applications (e.g., 156a or 156b) accessible via the internet 162 would include contact presence information, access to streaming media such as Netflix.com or youtube.com, internet VoIP applications such as skype.com, etc. Illustratively, application 156c demonstrates the telephony application as connected to the public switched telephone network 160 via a class five switch being connected to the fusion server 152—for the purpose of communicating events associated with the telephone network 160, i.e., such as inbound calls to the subscriber residence. As a further illustrative example, application 156d provides access to a subscriber data store 164, wherein subscriber data such as operator-provisioned permissions to use certain applications 156a-156d or access devices 154a-154d (discussed further below) may be stored and accessed by fusion server 152.

With continued reference to FIG. 1B, the second major interface direction is to a set of access devices 154a, 154b, 154c, and 154d. These access devices are directly engaged by the subscriber/user for the purpose of obtaining access to the fused applications presented to them by the fusion server 152. The number of access devices is illustratively shown as two devices, however, this number can be any number 'n' that may be needed to deploy any number of access devices as employed by the subscriber, as clearly illustrated in the schematic. Examples of access devices include VoIP terminals, computing devices, tablet computers, mobile phones, smart phones, and PSTN telephones.

The fusion server 152 thereby provides inter alia the ability to react to events either initiated by the applications, or by the access devices. Access device initiated communications events are created by the user interface at the access device, i.e., such as a user requesting data via pressing keys on their smartphone. An example of this would be a user querying their telephony call log to be displayed. Events initiated by the applications are created by network events, time events, or application events wherein the fusion server is informed or polls for such information to build its internal database, for presentation of the fused set of information and applications to the end user. An example of a application at 156c initiating a communication event is an inbound telephone call. Another example of an application at 156a initiating a communication event would be a internet instant text message. The fusion server 52, enabled by its interconnectivity with the applications 156a, 156b, 156c through 156d, combined with its internal data store and applications logic then enables the fusion server to be uniquely positioned in the schematic to combine and fuse the applications, the subscriber data, the access device data, etc., into a cohesive solution. Examples of this fusion include facebook.com user information (photo, preferred name) being combined with a caller ID of a communication event to present on a set-top television and a tablet computer simultaneously.

Figure 1C:
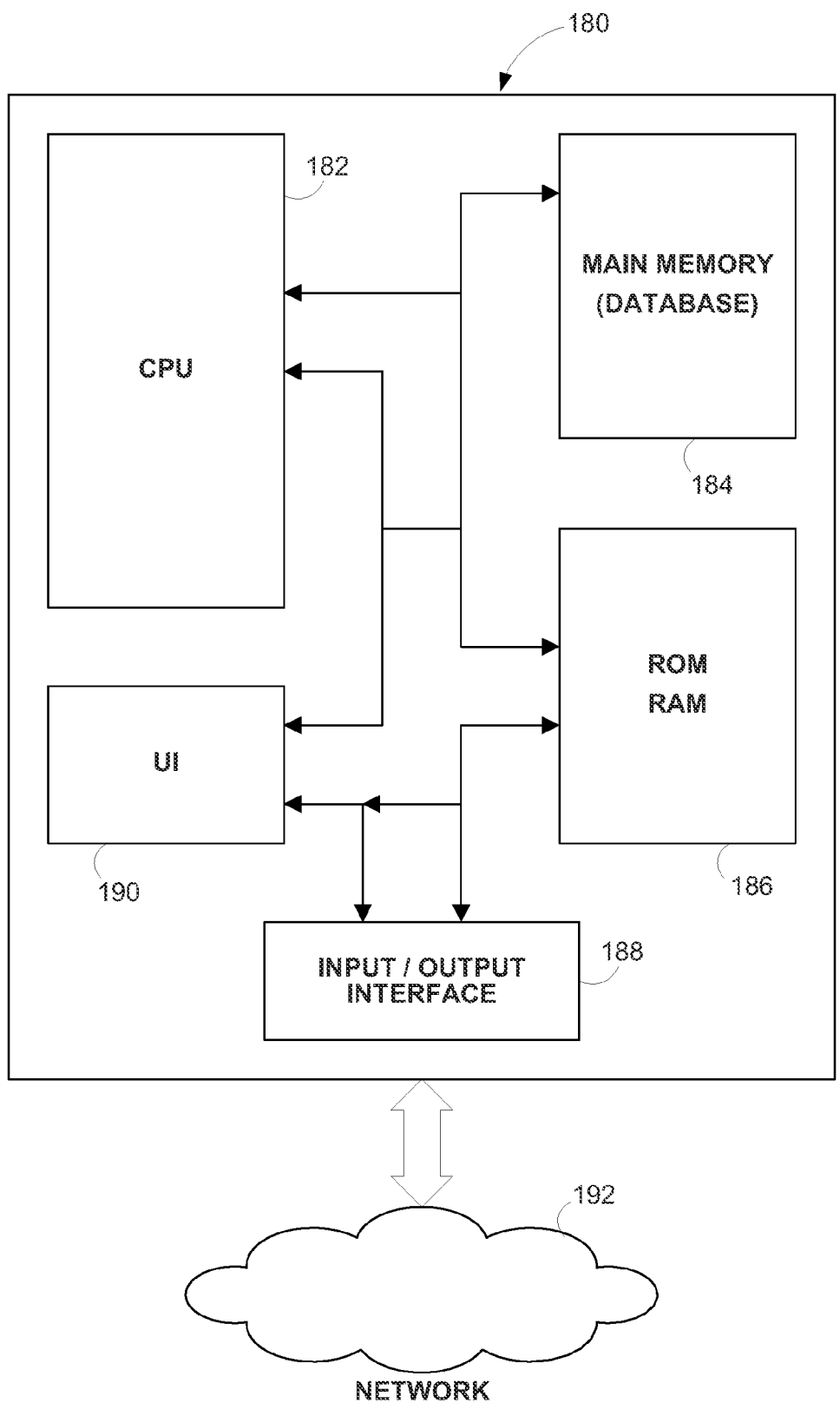
FIG. 1C is a block diagram of components within a fusion server, according to an illustrative embodiment of the invention.

FIG. 1C is a block diagram depicting the physical components of a processor 180 of the fusion server such as server 102 of FIG. 1A, according to an illustrative embodiment of the invention. Those skilled in the art will realize that each of the servers in FIGS. 1A and 1B, including fusion server 102 or 152, may include some or all of the components described in FIG. 1C.

With continued reference to FIGS. 1A, 1B and 1C, the exemplary processor 180 includes a central processing unit (CPU) 182, a memory 184 that includes a database, and an interconnect or communications bus coupling these components together. The CPU 182 may include a single microprocessor or a plurality of microprocessors for configuring processor 180 as a multi-processor system. The memory 184 illustratively includes a main memory and a read only memory. The processor 180 also includes the mass storage device 186 having, for example, various disk drives, tape drives, FLASH drives, etc., and includes the database of some exemplary embodiments. The main memory 184 also includes dynamic random access memory (DRAM) and high-speed cache memory, and includes the database in some exemplary embodiments. In operation, the main memory 184 stores at least portions of instructions and data for execution by the CPU 182.

The mass storage 186 may include one or more magnetic disk or tape drives or optical disk drives, for storing data and instructions for use by the CPU 182. At least one component of the mass storage system 186, preferably in the form of a disk drive or tape drive, stores the database used for storing and retrieving subscriber data used by the system of FIG. 1A. The mass storage system 186 may also include one or more drives for various portable media, such as a floppy disk, a compact disc read only memory (CD-ROM), DVD, or an integrated circuit non-volatile memory adapter (i.e. PC-MCIA adapter) to input and output data and code to and from the CPU 182.

The CPU 182 may also include one or more input/output interfaces for communications, shown by way of example, as interface 188 for data communications via the network 192. The network 192 may include one or more of other fusion servers, EBIF servers, provisioning servers, or other suitable devices. The data interface 188 may be a modem, a network card, serial port, bus adapter, or any other suitable data communications mechanism. To provide the functions of a fusion server 102 according to FIG. 1A (or fusion server 152 according to FIG. 1B), the data interface 188 may provide a relatively high-speed link to a network 192, such as the Internet 142 (FIG. 1A). The communication link to the network 192 may be, for example, optical, wired, or wireless (e.g., via satellite or cellular network).

With continued reference to FIGS. 1A, 1B and 1C, the CPU 182 also includes suitable input/output ports to couple to the interconnect bus for interconnection with a local user interface 190 serving as a local user interface for programming and/or data retrieval purposes. Alternatively, personnel may interact with the processor 180 for controlling and/or programming the fusion server from remote terminal devices via the network 192.

Processor 180 may run a variety of application programs and stores associated data in a database on mass storage system 186. One or more such applications may enable the receipt and delivery of messages to enable operation as a server, for implementing server functions relating to receiving application data and/or subscriber data thereby enabling application intelligence by the system 100 of FIG. 1A or system 150 of FIG. 1B.

Figure 2A:
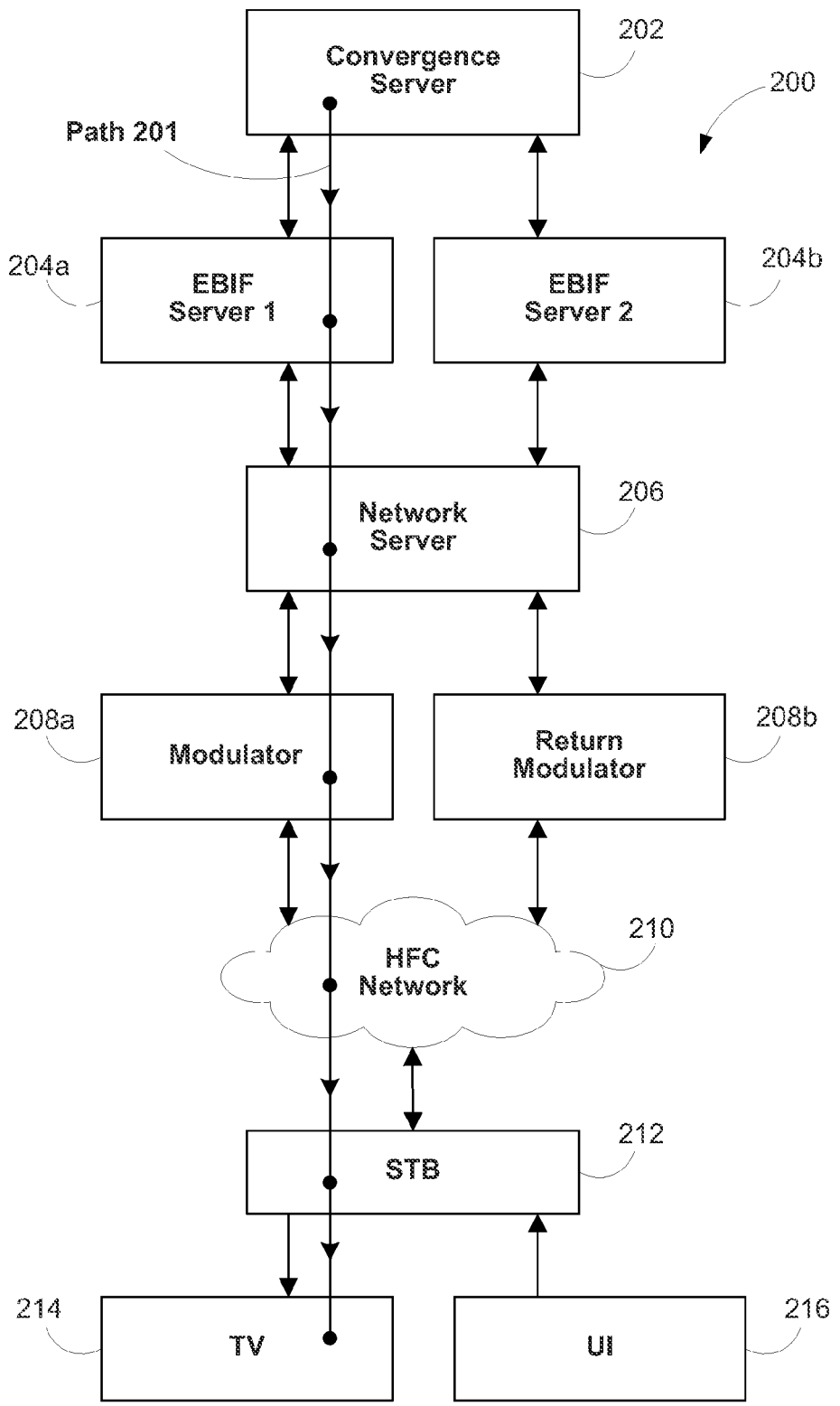
FIG. 2A is a forward data flow diagram of components coupled to a fusion server, according to an illustrative embodiment of the invention.

FIG. 2A is a forward data flow diagram 200 of components coupled to a fusion server, according to an illustrative embodiment of the invention. The fusion server may be coupled to other devices in a system as shown in FIG. 1A, and may be physically located in the head end of a cable television operator, such as head end 118 of FIG. 1A. The flow diagram includes a flow of data, path 201, from fusion server 202, via EBIF server 1 204a through network server 206, modulator 208a, and HFC network 210 to a subscriber access device such as STB 212 and TV 214. STB 212 may include a user interface device 216 such as a remote control or touch screen. Other components in FIG. 2A include EBIF server 2 204b and return modulator 208b. The data flow may include a message encoded in EBIF protocol such that the message is received and understood by STB 212. Such a message may include information on a subscriber such as their facebook.com profile status, their telephone number, or other subscriber and/or application data. In the illustrative example described above, such a message may include an instruction to the set-top box to display a "Call from Subscriber X" message on the STB 212. The message on the STB 212 may include other information, e.g., "Call from Subscriber X who is online at facebook.com".

Figure 2B:
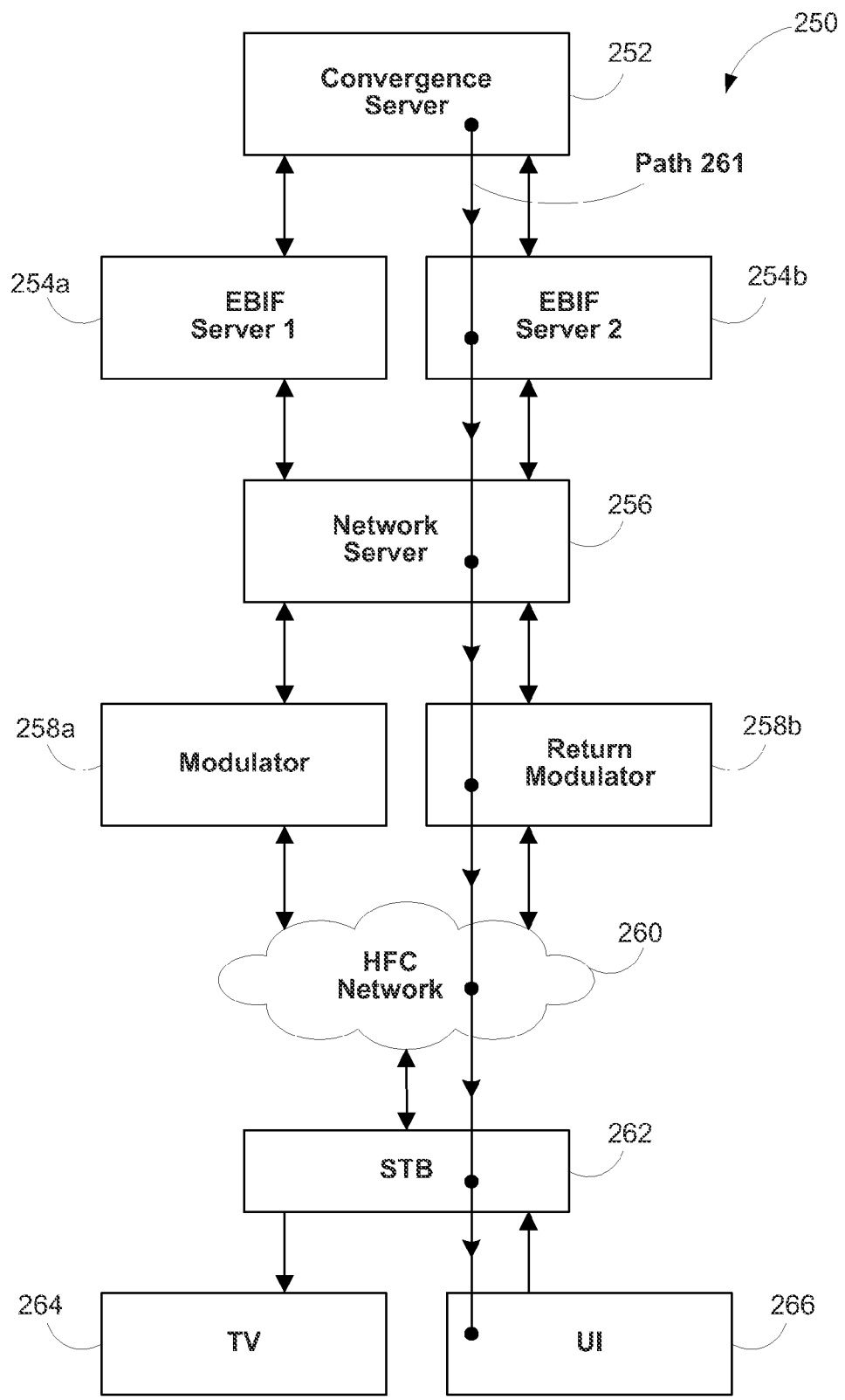
FIG. 2B is a return data flow diagram of components coupled to a fusion server, according to an illustrative embodiment of the invention.

FIG. 2B is a return data flow diagram 250 of components coupled to a fusion server, according to an illustrative embodiment of the invention. The fusion server may be coupled to other devices in a system as shown in FIG. 1A, and may be physically located in the head end of a cable television operator, such as head end 118 of FIG. 1A. The flow diagram includes a flow of data, path 261, from user interface device 266 (e.g., a remote control or a touch screen) to STB 262 to HFC network 260 to return modulator 258b, to network 256 to EBIF server 2 254b, and finally to fusion server 202. Other components in FIG. 2B include EBIF server 1 254a and (forward) modulator 208a. The data flow may include a message encoded in EBIF protocol such that the message is received and decoded by EBIF server 2 254b and then by fusion server 252. Such a message may include a command to begin transmitting voice packets to the STB. For example, a user interacting with their STB 262 may instruct the STB to play one or more voicemails. Fusion server 102 would receive such an instruction via the data flow path 261 and then provide the packetized voice data via data flow path such as flow path 201 of FIG. 2A. A message sent to fusion server 252 may also include information on a subscriber such as identifying information for their STB 262, their facebook.com profile status, their telephone number, or other subscriber and/or application data.

Figure 3:
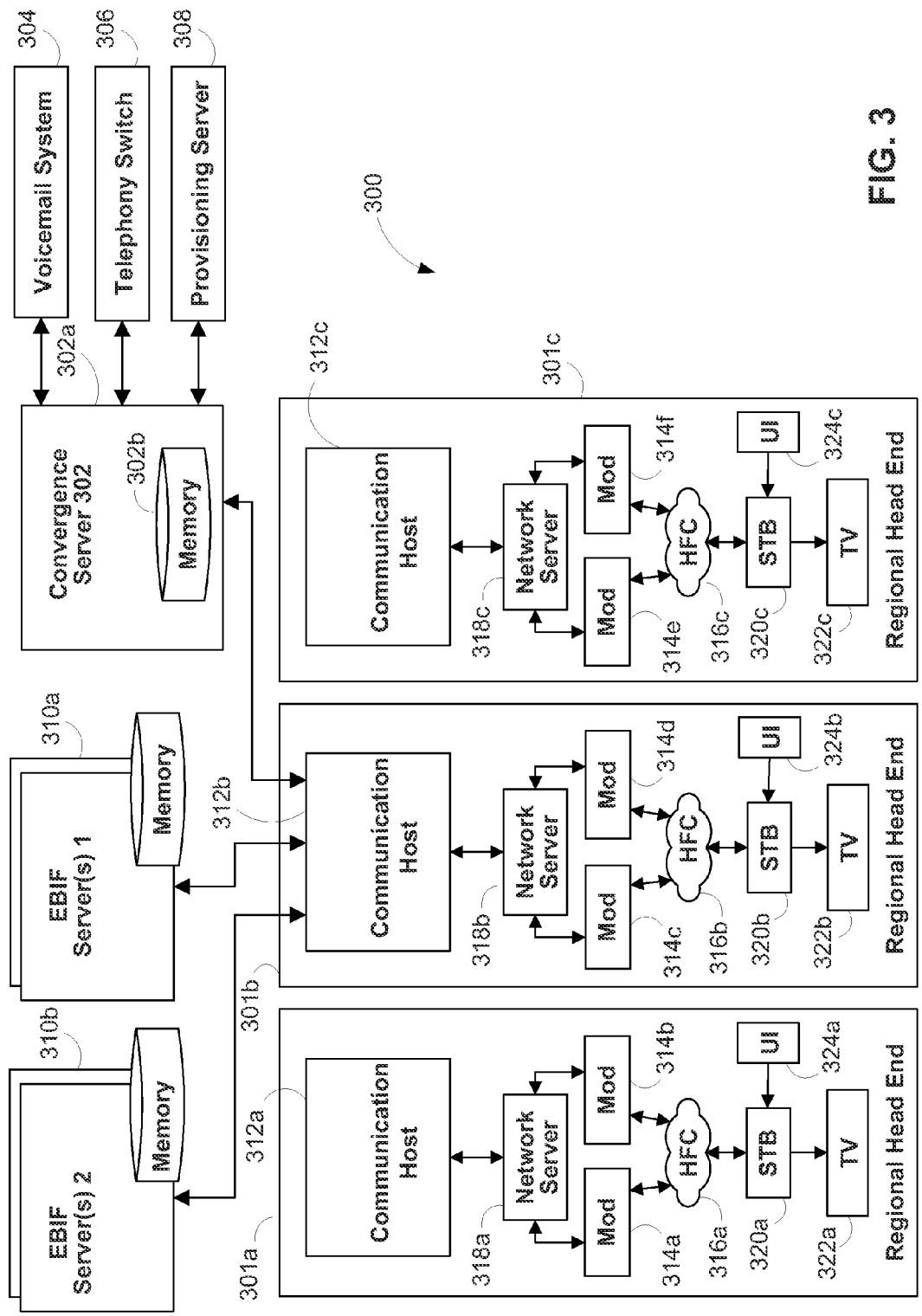
FIG. 3 is a schematic of a system for fusing applications and subscriber data including regional head-end components, according to an illustrative embodiment of the invention.

FIG. 3 is a schematic of a system 300 for fusing applications and subscriber data including regional head-end components 301a, 301b, and 301c, according to an illustrative embodiment of the invention. Regional head end components 301a, 301b, and 301c are each coupled to EBIF servers 310a, 310b and fusion server 302. Fusion server 302 includes memory 302b, and is coupled to voicemail system 304, telephony switch 306 and provisioning server 308. Each of the head end components 301a, 301b, and 301c include a communication host 312a, 312b, and 312c, respectively. The communication hosts 312a, 312b, and 312c, and coupled to network servers 318a, 318b, and 318c, respectively. Network servers 318a, 318b, and 318c, are coupled to modulators (mod) 314a-314f, and to STB 320a, 320b, and 320c, respectively, via HFC networks 316a, 316b, and 316c, respectively. Messages may be communicated between fusion server 302 and the STBs 320a-c or TVs 322a-c as described above with respect to paths 201 (FIG. 2A) and 261 (FIG. 2B). Thus, fusion server 302 may operate in a manner similar to that described with respect to FIGS. 1A-2B, however, there may be more than one head-end component in communication with a fusion server.

Figure 4:
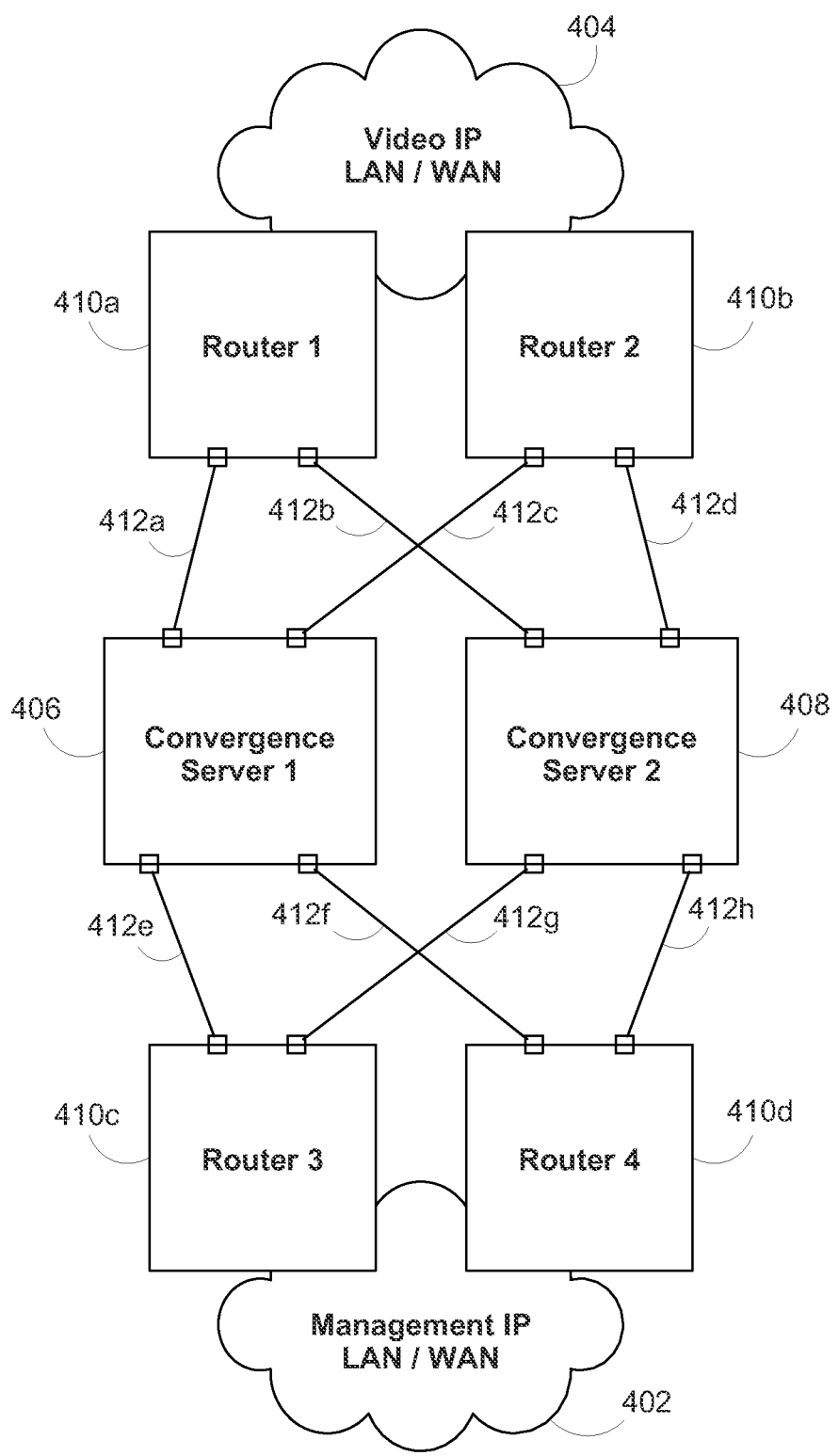
FIG. 4 is a schematic of a redundant connection including two fusion servers, according to an illustrative embodiment of the invention.

FIG. 4 is a schematic of a redundant connection including two fusion servers 406 and 408, according to an illustrative embodiment of the invention. In many instances, it is advantageous to install two fusion servers in the manner shown in FIG. 4 such that one fusion server will operate as a redundant, fusion server that is inactive except when the primary/main fusion server fails. Each of the fusion servers 406 and 408 is coupled to the video IP local area or wide area networks (LAN/WAN) 404 via multiple connections 412a-412d to routers 410a and 410b. Thus, if one of the fusion servers 406, 408 and/or routers 412a-412d fails, there will still be a path between the video IP LAN/Wan 404 and one of the fusion servers 406 or 408. Similarly, each of the fusion servers 406 and 408 is coupled to a management IP LAN/WAN 402 via multiple connections 412e-412h to routers 410c and 410d. Thus, if one of the fusion servers 406,408 and/or routers 412e-412h fails, there will still be a path between the video IP LAN/Wan 404 and one of the fusion servers 406 or 408.

Figure 5:
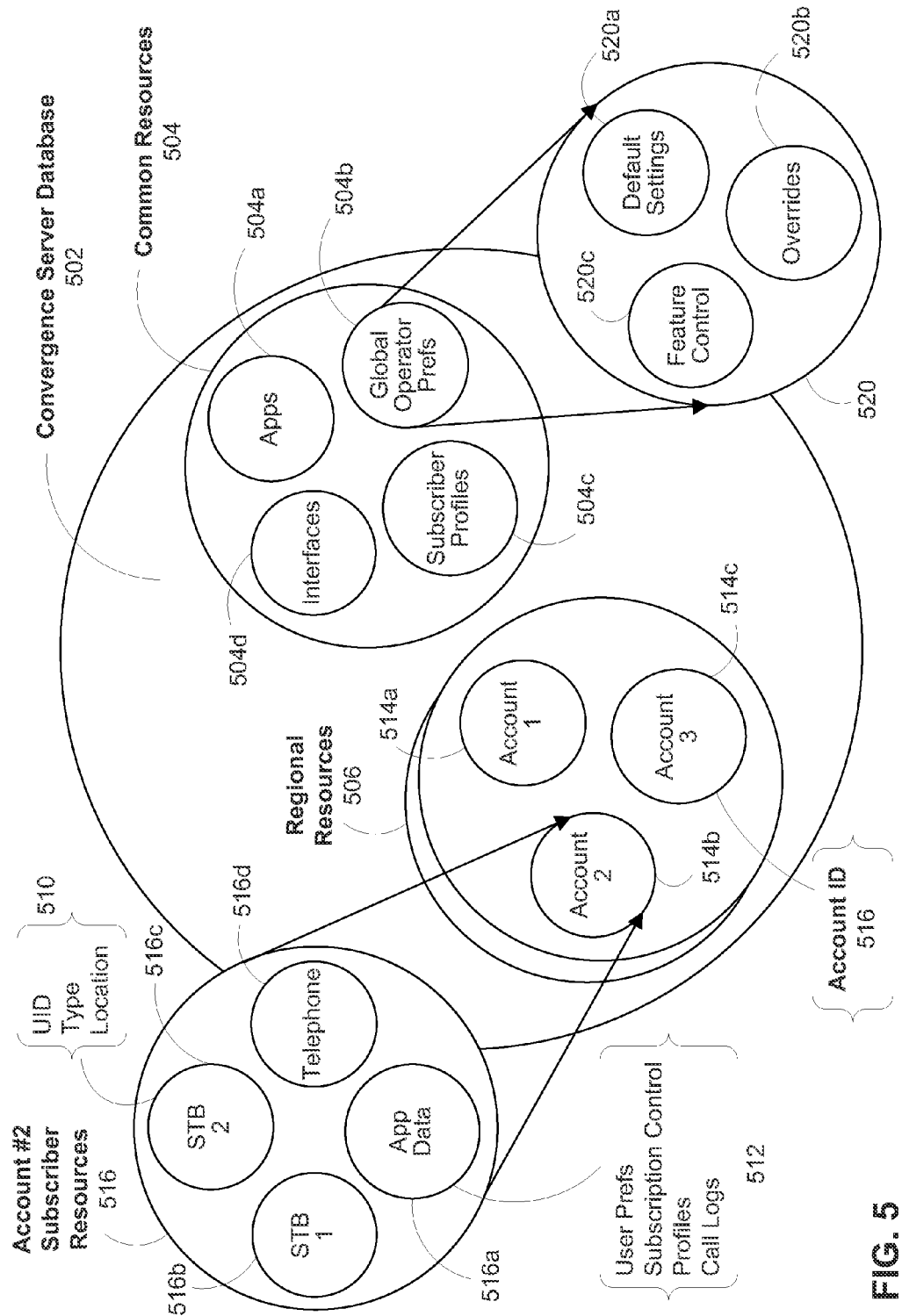
FIG. 5 is a schematic of a fusion server database including several data structures, according to an illustrative embodiment of the invention.

FIG. 5 is a schematic of a fusion server database 502 including several data structures, according to an illustrative embodiment of the invention. The fusion server database 502 would be stored in mass storage 186 (FIG. 2A) of a fusion server 102 (FIG. 1A), and may be constructed in any suitable database programming language, e.g., SQL. Database 502 includes data structures for common resources 504 and data structure for regional resources 506, which may be shared across a plurality of regional head ends (such as those shown in FIG. 3). The data structures may be any suitable database construct such as a list, linked list, or pointer data structure. The common resources data structure 504 include data associated with applications 504a, interfaces with subscriber access devices and/or different data format message 504d, global operator preferences 504b, and subscriber profiles 504c. The subscriber profiles may include information on the subscriber such as their set-top box identification information, cell phone number, list of contacts, etc. Each of the data structures of the common resources data structure 504 may include subsidiary data structures. The global operator preferences data structure 504b includes a sub data structure 520 of feature control data 520c, overrides 520b and default settings 520a. The regional resources data structure 506 may include a data structure associated with each regional head end component, such as the head end components illustrated in FIG. 3.

The regional resources include information associated with each account, e.g., Accounts 1 (514a), 2 (514b) and 3(514c). Each of these accounts may have associated information stored in the data structures such as an account ID 516. In turn, each account, e.g., Account 2 (514b), may have subsidiary data structures associated with it, such as account 2's subscriber resources data structure 516. For instance, account 2 (514b) has a data structure 516 including data associated with two set-top boxes STB 1 (516b) and STB 2 (516c), telephone (516d) and applications (516a). Examples of data that may be associated with the applications data structure 516a are user preferences, subscription control, user profiles, and call logs 512. Those skilled in the art will come to realize that many other applications data could be stored in structure 516a. Examples of data that may be associated with the set-top box data structure 516c are set-top box user ID, set top box type, and set-top box location (e.g., IP address, or residence identifier) 510. Those skilled in the art will come to realize that many other applications data could be stored in structure 516c. When subscriber data and/or application data are received from one or more devices that are coupled to a fusion server, these data are stored in the fusion server database 502.

Figure 6:
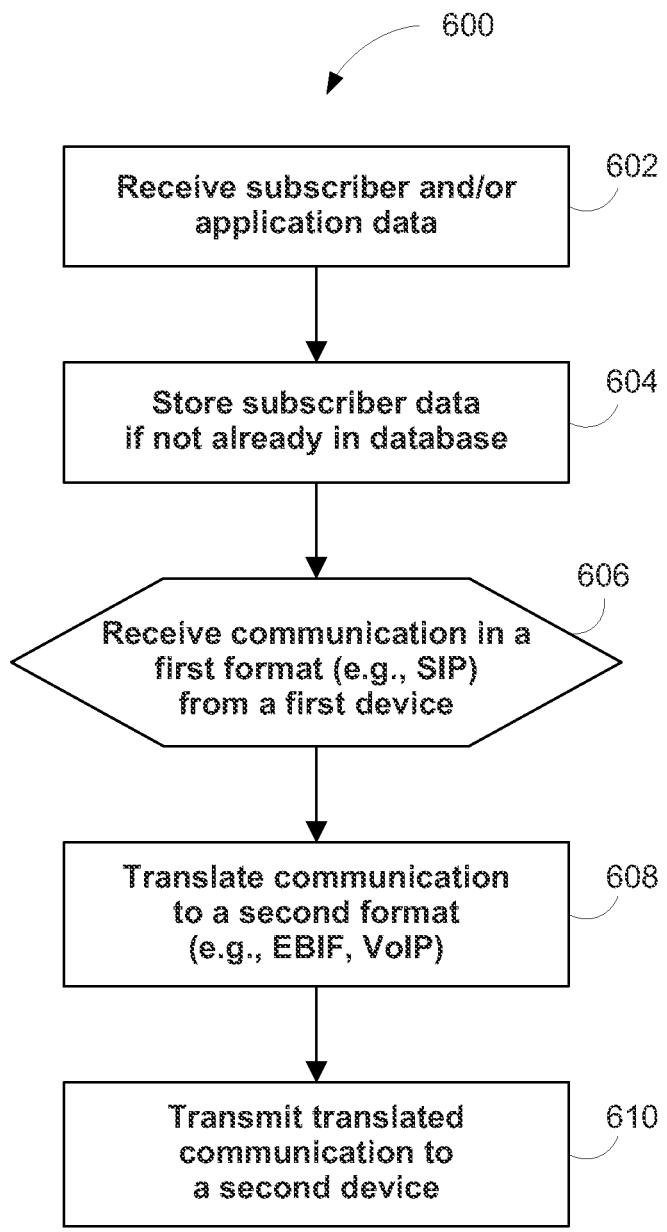
FIG. 6 is a process flow diagram for a method for fusing applications and subscriber data, according to an illustrative embodiment of the invention.

FIG. 6 is a process flow diagram 600 for a method for fusing applications and subscriber data, according to an illustrative embodiment of the invention. The method of diagram 600 may be performed using the fusion server 102 of FIG. 1A, which was further described with respect to FIGS. 1B-5.

With continued reference to FIGS. 1A and 6, process 600 includes a step of fusion server 102 receiving subscriber and/or application data (602). Subscriber data may originate from any application running on any of the subscriber access devices 117 and may be received in any suitable format. Examples of data include those provided above such as a subscriber's set-top box identity, a subscriber's telephone number, a subscriber's facebook.com profile status, etc. Fusion server 102 checks to see if the subscriber data it received has already been stored in the fusion server database 506 (FIG. 5). If the received subscriber data has not been stored in the database, fusion server stores the received data in the fusion server database (604). Fusion server 102 may also receive a communication originating from a first subscriber access device (e.g., a mobile phone) in a first format (606). This message may include subscriber data, application data, or any other data in the first format. For example, the message may be an incoming phone call notification from a telephony switch 112, or a change in status notification from facebook.com via the Internet 116, Fusion server 102 translates the received data to a second format (608). The translation of the data may be performed by first extracting a portion of the communication including subscriber identification information from the first of the subscriber access devices, then retrieving identifying information for the second of the subscriber access devices from the database of the fusion server, and finally, by inserting the retrieved subscriber identification data into a communication in the second format. Fusion server 102 then transmits the formatted data such that it eventually is received by a second subscriber access device (e.g., a tablet computer or a personal computer) (610).

Generally, the methods described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit.

The process described herein may also be realized as a software component operating on a conventional data processing system such as a UNIX workstation or server. In such an embodiment, the process may be implemented as a computer program written in any of several languages well-known to those of ordinary skill in the art, such as (but not limited to) C, C++, FORTRAN, Java, SQL, or BASIC. The process may also be executed on commonly available clusters of processors, such as Western Scientific Linux clusters, which are able to allow parallel execution of all or some of the steps in the present process.

The method for fusing applications and subscriber data described herein may be performed in either hardware, software, or any combination thereof, as those terms are currently known in the art. In particular, the present method may be carried out by software, firmware, or microcode operating on a computer or computers of any type, including preexisting or already-installed telephony, video, voice-over-IP, or other processing facilities capable of supporting any or all of the fusion server's functions. Additionally, software embodying the systems and methods described herein may comprise computer instructions in any form (e.g., source code, object code, interpreted code, etc.) stored in any non-transitory computer-readable medium (e.g., ROM, RAM, magnetic media, punched tape or card, compact disc (CD) in any form, DVD, etc.). Accordingly, the systems and methods described herein are not limited to any particular platform, unless specifically stated otherwise in the present disclosure.

The invention may be embodied in other specific forms without departing from the spirit or essential characteristics thereof. The forgoing embodiments are therefore to be considered in all respects illustrative, rather than limiting of the invention.

What is claimed is:

1. A method comprising:
receiving, by a fusion server coupled to a voice-over-IP telephony switch and a streaming media server, subscriber data, wherein the subscriber data specifies a plurality of applications utilized by a subscriber;
storing, by the fusion server, the received subscriber data in a database of the fusion server;
receiving, by a fusion server, access device data from the voice-over-IP telephony switch or the streaming media server for a plurality of access devices associated with the subscriber;
storing, by the fusion server, the access device data received from the voice-over-IP telephony switch or the streaming media server in the database of the fusion server;
receiving a first communication event from the voice-over-IP telephony switch in a first format, wherein the first communication event from the voice-over-IP telephony switch originates from a sender using a first application of the plurality of applications utilized by the subscriber;
extracting, by the fusion server, subscriber identification information from the first communication event from the voice-over-IP telephony switch;
retrieving, from the database of the fusion server based on the extracted subscriber identification information, access device data for one or more access devices utilized by the subscriber;
retrieving, based on the subscriber data, sender information describing the sender's use of one or more of the plurality of applications utilized by the subscriber;
inserting, by the fusion server, a portion of the first communication event from the voice-over-IP telephony switch and the sender information into a second communication event in a second format for presentation by a second one of the plurality of applications utilized by the subscriber; and
transmitting, by the fusion server, the second communication event, wherein the second communication event is routed by the fusion server, to the one or more utilized access devices using the access device data, each of the plurality of access devices running the second one of the plurality of applications.

2. The method of claim 1, wherein the access device includes two or more of a mobile phone, a smart phone, a VoIP terminal, a tablet computer, a personal computer, a television, and a public switched telephone network (PSTN) telephone.

3. The method of claim 1, wherein the first format includes at least one of session initiation protocol (SIP), hypertext transfer protocol (HTTP), voice-over-IP (VoIP), simple object access protocol over extensible markup language (SOAP/XML), remote procedure call (RPC), and enhanced tv binary exchange format (EBIF).

4. The method of claim 1, wherein the plurality of applications includes an application for managing the subscriber's voice calls.

5. The method of claim 1, wherein the plurality of applications includes an application for managing the subscriber's list of contacts.

6. The method of claim 1, wherein the plurality of applications includes an application for managing the subscriber's electronic mail.

7. The method of claim 1, wherein the plurality of applications includes an application for managing caller identification for a subscriber's telephone number.

8. The method of claim 1, wherein the second format includes one of session initiation protocol (SIP), hypertext transfer protocol (HTTP), voice-over-IP (VoIP), simple object access protocol over extensible markup language (SOAP/XML), remote procedure call (RPC), and enhanced tv binary exchange format (EBIF).

9. The method of claim 1, wherein the plurality of applications includes an internet website application.

10. A system that enables the fusion for a subscriber of a plurality of applications and subscriber data across a plurality of subscriber access devices, the system comprising:
a fusion server including a processor, a memory including a database, and a network interface, wherein the fusion server is coupled to a voice-over-IP telephony switch and a streaming media server, and wherein the fusion server is configured to:
receive subscriber data, wherein the subscriber data specifies a plurality of applications utilized by a subscriber;
store the received subscriber data in the database;
receive access device data from the voice-over-IP telephony switch or the streaming media server regarding each of a plurality of access devices associated with the subscriber;
store the access device received from the voice-over-IP telephony switch or the streaming media server data in the database of the fusion server;
receive a communication event from the voice-over-IP telephony switch in a first format, wherein the communication event from the voice-over-IP telephony switch originates from a sender using a first application of the plurality of applications utilized by the subscriber;
extract, by the fusion server, subscriber identification information from the first communication event from the voice-over-IP telephony switch;
retrieve, from the database of the fusion server, based on the extracted subscriber identification information, access device data for one or more access devices utilized by the subscriber;
retrieve, based on the subscriber data, sender information describing the sender's use of one or more of the plurality of applications utilized by the subscriber;
insert, by the fusion server, a portion of the first communication event from the voice-over-IP telephony switch and the sender information into a second communication event in a second format for presentation by a second one of the plurality of applications utilized by the subscriber; and transmit the second communication event and route the second communication event to the one or more utilized access devices using the access device data, each of the plurality of access devices running the second application.

11. The system of claim 10, wherein the computer device includes two or more of a mobile phone, a smart phone, a VoIP terminal, a tablet computer, a personal computer, a television and a public switched telephone network (PSTN) telephone.

12. The system of claim 10, wherein the first format includes at least one of session initiation protocol (SIP), hypertext transfer protocol (HTTP), voice-over-IP (VoIP), simple object access protocol over extensible markup language (SOAP/XML), remote procedure call (RPC), and enhanced tv binary exchange format (EBIF).

13. The system of claim 10, wherein the plurality of applications includes an application for managing the subscriber's voice calls.

14. The system of claim 10, wherein the plurality of applications includes an application for managing the subscriber's list of contacts.

15. The system of claim 10, wherein the plurality of applications includes an application for managing the subscriber's electronic mail.

16. The system of claim 10, wherein the plurality of applications includes an application for managing caller identification for a subscriber's telephone number.

17. The system of claim 10, wherein the second format includes one of session initiation protocol (SIP), hypertext transfer protocol (1-ITTP), voice-over-IP (VoIP), simple object access protocol over extensible markup language (SOAP/XML), remote procedure call (RPC), and enhanced tv binary exchange format (EBIF).

18. The system of claim 10, wherein the plurality of applications includes an internet website application accessible.

19. A method for fusing, for a subscriber, a plurality of applications and subscriber data across a plurality of subscriber access devices, the method comprising:
   receiving, by a fusion server coupled to a voice-over-IP telephony switch and a streaming media server, subscriber data, wherein the subscriber data specifies a plurality of applications utilized by a subscriber;
   storing, by the fusion server, the received subscriber data in a database of the fusion server;
   receiving, by a fusion server, access device data from the voice-over-IP telephony switch or the streaming media server for each of a plurality of access devices associated with the subscriber;
   storing, by the fusion server, the access device data received from the voice-over-IP telephony switch or the streaming media server in the database of the fusion server;
   receiving a first communication event from the voice-over-IP telephony switch in a first format, wherein the first communication event from the voice-over-IP telephony switch originates from a sender using a first application of the plurality of applications utilized by the subscriber;
   extracting subscriber identification information from the first communication event from the voice-over-IP telephony switch;
   searching the subscriber data and the access device data to determine one or more access devices utilized by the subscriber;
   retrieving, by the fusion server based on the subscriber data, sender information describing the sender's use of one or more of the plurality of applications utilized by the subscriber;
   insert a portion of the first communication event from the voice-over-IP telephony switch and the sender information into a second communication event in a second format for presentation by a second one of the plurality of applications utilized by the subscriber; and
   transmitting, by the fusion server, the second communication event, wherein the second communication event is routed by the fusion server, to one or more utilized access devices using the access device data, each of the plurality of access devices running the second application.

20. The method of claim 1, wherein the retrieved sender information describes profile information for the sender as provided one or more of the plurality of applications utilized by the subscriber.

21. The method of claim 5, wherein the sender information is retrieved from the subscriber's list of contacts.

22. The system of claim 10, wherein the retrieved sender information describes profile information for the sender as provided one or more of the plurality of applications utilized by the subscriber.

23. The system of claim 14, wherein the sender information is retrieved from the subscriber's list of contacts.

* * * * *